(12) United States Patent
Zeeper

(10) Patent No.: US 6,948,844 B2
(45) Date of Patent: Sep. 27, 2005

(54) OLIVE STUFFING METHOD AND APPARATUS

(76) Inventor: Al Zeeper, 15019 - 131 Street, Edmonton, Alberta (CA), T6V 1K3

( * ) Notice: Subject to any disclaimer, the term of this patent is extended or adjusted under 35 U.S.C. 154(b) by 262 days.

(21) Appl. No.: 10/193,195

(22) Filed: Jul. 12, 2002

(65) Prior Publication Data

US 2004/0009270 A1 Jan. 15, 2004

(51) Int. Cl.[7] .................................................. B01F 9/02
(52) U.S. Cl. ..................................... 366/213; 366/232
(58) Field of Search .............................. 366/46, 47, 54, 366/55, 62, 63, 98, 213, 220, 228, 232, 56, 57, 214; 118/19, 418

(56) References Cited

U.S. PATENT DOCUMENTS

| | | | | |
|---|---|---|---|---|
| 998,257 A | * | 7/1911 | Nickerson | .................... 366/214 |
| 2,609,853 A | | 9/1952 | Smith | |
| 2,944,799 A | * | 7/1960 | Larson | ......................... 366/57 |
| 3,772,982 A | | 11/1973 | Smith | |
| 3,962,474 A | | 6/1976 | Smith | |
| 4,006,256 A | | 2/1977 | Kyros | |
| 4,102,257 A | | 7/1978 | Gonzalez | |
| 4,373,029 A | * | 2/1983 | Nees | ......................... 435/298.2 |
| 4,521,116 A | * | 6/1985 | Adsit | ........................... 366/54 |
| 4,663,174 A | | 5/1987 | Ollero Pina et al. | |
| 5,176,070 A | | 1/1993 | Marco | |
| 5,236,263 A | * | 8/1993 | Friedland | ..................... 366/213 |
| 5,302,017 A | * | 4/1994 | Platek et al. | ................... 366/57 |
| 5,704,711 A | * | 1/1998 | Simmons | .................... 366/199 |
| 5,934,800 A | * | 8/1999 | Bonacci | ....................... 366/47 |
| 6,220,744 B1 | * | 4/2001 | Blackhurst | .................... 366/47 |

* cited by examiner

Primary Examiner—David Sorkin
(74) Attorney, Agent, or Firm—Donald V. Tomkins

(57) ABSTRACT

Apparatus for stuffing pitted olives with an edible filling features a drum and drum holder, plus drive means for rotating the drum holder and drum about a selected rotational axis. Pitted olives are placed in a drum along with a quantity of filling, then the drum is rotated, agitating the olives and filling in tumbling fashion, and causing the filling to work its way into the cavities in the olives. The invention facilitates stuffing of large quantities of olives at one time, rather than individually, without manual contact with the olives or the stuffing materials. Effective stuffing may be accomplished with a variety of filling materials. The efficacy of the stuffing process may be enhanced by imparting reciprocating motion to the drum in addition to rotational movement, and by providing protuberances on the interior surface of the drum.

17 Claims, 2 Drawing Sheets

OLIVE STUFFING METHOD AND APPARATUS

FIELD OF THE INVENTION

The present invention relates to apparatus and methods for stuffing pitted olives.

BACKGROUND OF THE INVENTION

Pitted olives stuffed with edible fillings of various kinds are popular delicacies. Edible fillings commonly stuffed into pitted olives include foodstuffs such as vegetable pieces (e.g., pimentos, garlic cloves, onions, artichokes, sun-dried tomatoes), nut meats (e.g., almonds or almond pieces), cheese and cheese mixtures, and meat pastes. Olive stuffing is often done manually, but this procedure has numerous drawbacks. It can be tedious and inefficient work, as each olive must be stuffed individually. It requires a certain degree of manual dexterity. It can be messy work as well, especially when the olives are being stuffed with a soft filling material such as a cheese mixture or meat paste. Furthermore, it can be unsanitary and unhealthy if the persons stuffing the olives do not take adequate precautions against contamination of the olives arid filling materials. take adequate precautions against contamination of the olives and filling materials.

The prior art illustrates numerous examples of apparatus and methods for stuffing olives. U.S. Pat. No. 2,609,853, to L. H. Smith issued on Sep. 9, 1952, discloses a machine directed in particular to stuffing olives with pieces of pimento. U.S. Pat. No. 3,772,982, issued to W. W. Smith on Nov. 20, 1973, respectively, discloses apparatus for slicing freeze-dried pimiento and then stuffing olives with the pimiento slices. U.S. Pat. No. 4,102,257, issued to Gonzalez on Jul. 25, 1978, and U.S. Pat. No. 5,176,070, issued to Marco on Jan. 5, 1993, disclose further examples of prior art olive-stuffing apparatus.

All of these prior art devices are characterized by considerable mechanical complexity and many moving parts, which makes them costly to manufacture, and susceptible to wear and breakdown, than simpler apparatus might be. A further drawback to these prior art devices is that each is generally suited to stuffing olives with only one type of filling material. For instance, the Marco device is specifically directed to stuffing olives with a meat paste, and may be functional to some degree for other paste-like filling materials, but quite clearly would not be suitable, satisfactorily if at all, for stuffing olives with pieces of pimiento or other vegetables. Similarly, it may be readily observed that although the L. H. Smith device may be functional for stuffing olives with pieces of pimiento, it is unsuitable for stuffing olives with a paste-like filling.

For the foregoing reasons, there is a need for an apparatus and method of stuffing pitted olives with an edible filling:

(a) such that manual contact and handling of the olives and filling material is minimized or eliminated, thus minimizing the messiness and maximizing the cleanliness of the olive-stuffing operation;

(b) with apparatus of minimal mechanical complexity; and (c) with apparatus suitable for stuffing olives with a variety of filling types.

BRIEF SUMMARY OF THE INVENTION

The present invention is directed to the foregoing needs. In general terms, the invention is a method and apparatus for stuffing pitted olives, in accordance with which a quantity of pitted olives may be placed in a drum along with a quantity of selected edible filling material, whereupon the drum is rotated such that the olives and filling material are interminglingly tossed about inside the drum for a period of time, with the result that the filling material migrates into the cavities created by the pitting of the olives. The invention thus facilitates stuffing of large quantities of olives at one time, rather than individually, without need of manual contact with the olives or the filling material.

Accordingly, the invention in one aspect is a method of stuffing pitted olives with an edible filling, said method comprising the steps of:

(a) placing a quantity of pitted olives in a drum;

(b) introducing a quantity of edible filling into the drum; and (c) rotating the drum about a selected rotational axis, at a selected rate of rotation such that the mixture of pitted olives and edible filling will be agitated together in tumbling fashion.

In another aspect, the invention is an apparatus for stuffing pitted olives with an edible filling, said apparatus comprising:

(a) a drum holder;

(b) a drum, mountable in the drum holder; and (c) drive means, for rotating the drum holder about a selected rotational axis.

In the preferred embodiment, the apparatus includes lid-clamping means to preventing the lid of the drum from opening when the apparatus is in use.

The drum may be cylindrical or frustoconical in shape, of polygonal cross-section. In the preferred embodiments of the apparatus and method, the rotational axis substantially coincides with the longitudinal axis of the drum, whatever shape the drum may take. Also in the preferred embodiments, the rotational axis is substantially horizontal, and may slope slightly upward from the horizontal. However, the rotational axis may also slope downward from the horizontal. The apparatus may include means for tilting the rotational axis.

The drive means may include an electric motor with either a belt-drive or chain-drive linkage with the drum holder. The electric motor may be a gear motor.

In the preferred embodiment, the drive means of the apparatus includes means for regulating the rotational speed of the drum holder and the drum. In the preferred embodiment of the method of the invention, the rotational speed is in the range between 50 and 75 revolutions per minute.

The apparatus may include means for moving the drum in reciprocating fashion, concurrently with its rotation about the rotational axis. The direction of reciprocating movement may be either horizontal or vertical, or both.

In an alternative embodiment, the apparatus includes a second drum holder, for holding a second drum. In this "twin-drive" embodiment, the drive means is adapted to rotate both drums simultaneously, at the same or different rotational speeds.

The filling used in accordance with method of the invention may be selected from a variety of edible materials, including but not limited to fillings comprising cheese, nut meats, vegetable pieces, or spices.

BRIEF DESCRIPTION OF THE DRAWINGS

Embodiments of the invention will now be described with reference to the accompanying figures, in which numerical references denote like parts, and in which.

DETAILED DESCRIPTION OF THE PREFERRED EMBODIMENT

Figure 1:
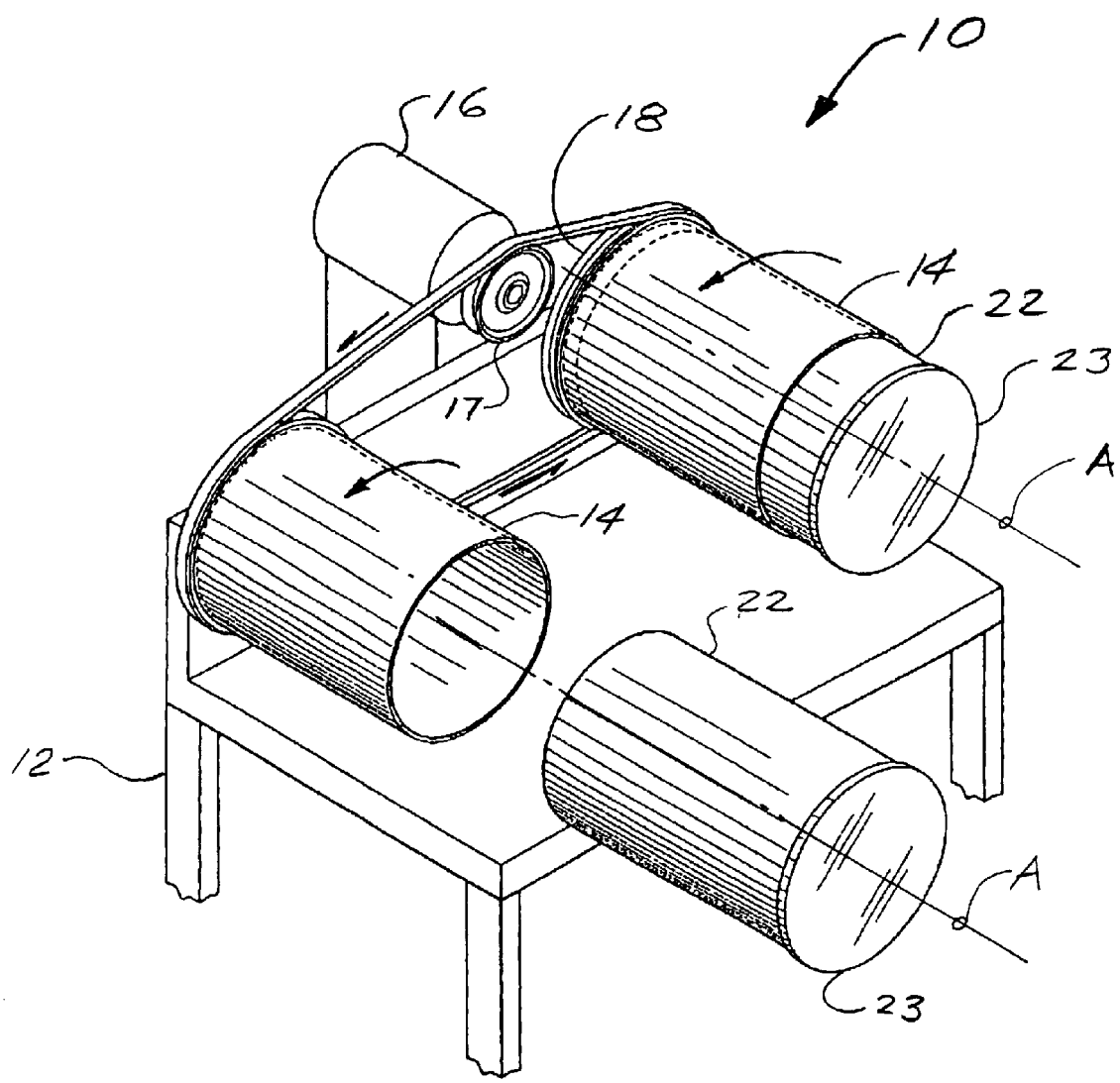
FIG. 1 is an isometric view of the preferred embodiment of the apparatus of the invention.
Figure 2:
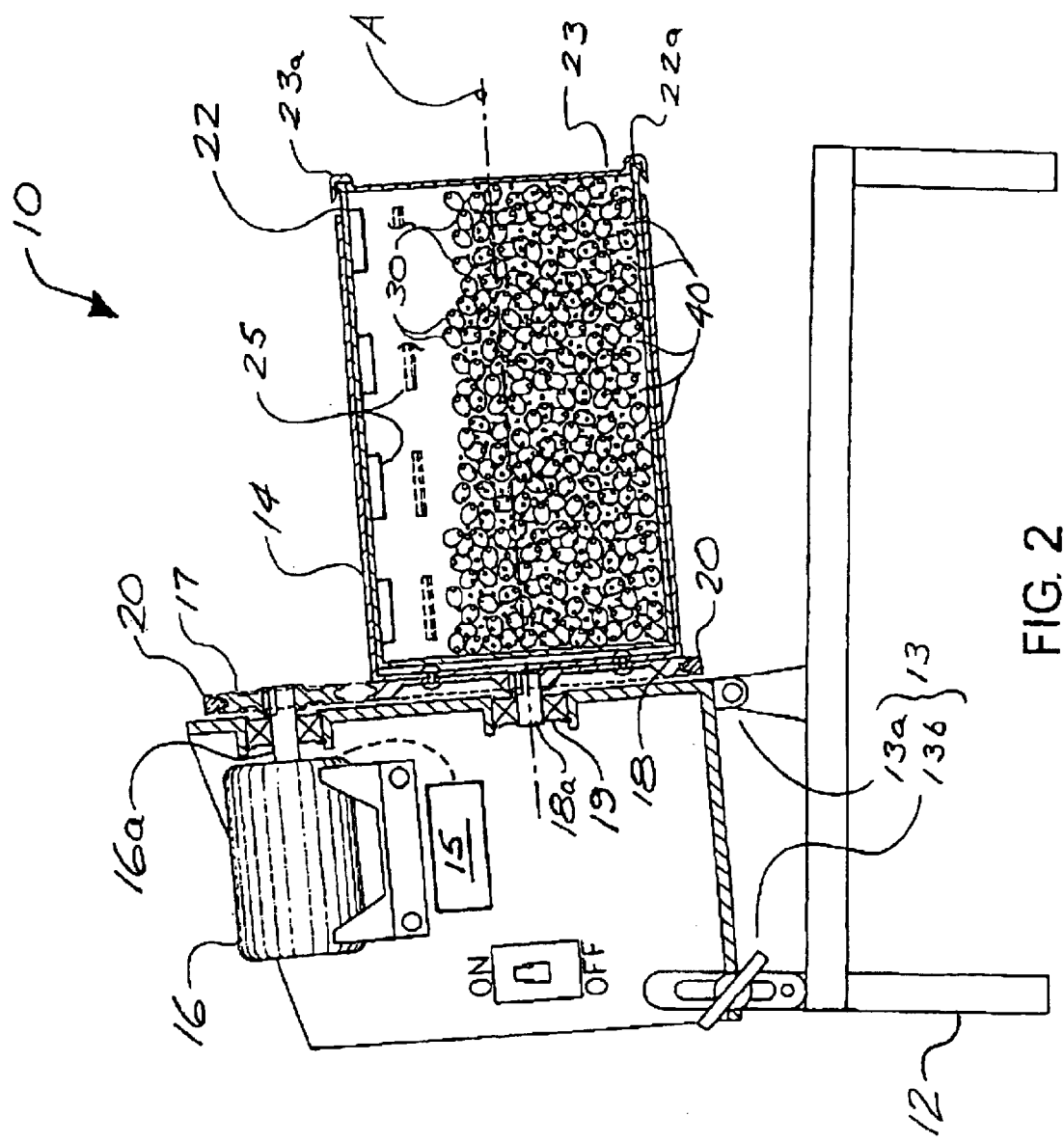
FIG. 2 is an sectional side view of the apparatus of the invention.

Referring to FIGS. 1 and 2, the apparatus of the present invention, generally designated by reference numeral 10, has a frame 12, one or more drum holders 14 rotatably mounted to the frame 12, and a motor 16 mounted to the frame, plus drive means for using the motor 16 to rotate the one or more drum holders 14 about a selected rotational axis A.

Rotational axis A will be predominantly horizontal, but may be tilted upward, as in the preferred embodiment, or downward from the horizontal. In the preferred embodiment, the apparatus 10 includes axis-tilting means 13, for setting the rotational axis A in a desired orientation.

As illustrated in FIG. 2, the axis-tilting means 13 may comprise a hinge 13a and clamping means 13b, each of which may be of any well-known conventional type. However, other axis-tilting means 13 may be used without departing from the concept of the invention.

The frame 12 may be of any desired construction suitable for mounting the other components of the apparatus 10, and suitably robust to allow for satisfactory operation thereof.

In the preferred embodiment, rotatable mounting of each drum holder 14 is accomplished by way of a drum pulley 18 fixed to the drum holder 14 as generally indicated in the Figures, with the drum pulley 18 having a shaft 18a which rotates in a bearing 19 mounted to the frame 12. The motor 16 has a power output shaft 16a and a motor pulley 17 mounted on the output shaft 16a so as to be substantially coplanar with the one or more drum pulleys 18. A drive belt 20 is deployed around the motor pulley 17 and the one or more drum pulleys 18. The motor pulley 17 and the one or more drum pulleys 18 may be V-groove pulleys, in which case the drive belt 20 will be a conventional V-belt. However, pulleys and drive belts of other types well known in the art may also be used. In an alternative embodiment (not illustrated), conventional toothed sprockets are used in lieu of the motor pulley 17 and drum pulleys 18, and a drive chain is deployed around the motor sprocket and the drum sprockets.

Each drum holder 14 is adapted to receive and securely hold a drum 22 into which a desired quantity of pitted olives may be placed. In the Figures, each drum 22 is illustrated as being cylindrical in shape. However, the shape of the drum 22 is not critical to the apparatus or the method of the present invention. The drum 22 may take any of various alternative shapes, including frustoconical (i.e., like a conventional pail, tapering in diameter toward the closed end), and either prismatically or taperingly polygonal in cross-section.

As illustrated in FIG. 1, the drum holder 14 may be fashioned in a shape matingly similar to that of the drum 22 being used, such that mounting the drum 22 on the drum holder 14 is a simple matter of inserting the drum 22 into the drum holder 14, which in turn holds the drum 22 securely by friction fit. This has been found to work satisfactorily in the particular case where the drum 22 is of frustoconical shape, such as the plastic pails in which bulk pitted olives are commonly packed and shipped, and in this case the drum holder 14 may be conveniently and easily fashioned from such a pail. However, this arrangement is not critical; the drum holder 14 may comprise alternative means of securely holding a drum, such as clamps, brackets, flanges, bolts, straps, or other well known accessories, without departing from the essential concept of the invention.

FIG. 1 illustrates the preferred embodiment of the apparatus 10, which features two drum holders 14 each adapted to receive a drum 22. The drum holder 14 at the left side of FIG. 1 is shown ready to receive a drum 22, while a drum has already been mounted in the drum holder 14 on the right. However, the apparatus 10 may have only a single drum 22, or may have more than two drums 22, without departing from the concept of the invention.

In FIG. 1, each drum 22 is shown fitted with a lid 23, which may be hingedly connected to the drum 22, or may be removably securable to the drum 22 by means of a perimeter groove 23a in the lid 23 which is engageable with a perimeter flange 22a on the drum 22, as illustrated in FIG. 2. In one alternative embodiment, the apparatus 10 includes lid-clamping means (not shown) for greater assurance that the lid 23 will not become unexpectedly loosened during operation of the apparatus 10. The lid-clamping means could of any type well known in the art, selected or adapted to suit the particular type of drum 22 being used. In a further alternative embodiment (not illustrated), the lid 23 may be firmly connected or fastened to the drum 22, or even formed integrally with the drum 22. In that case, a hatch (not shown) will be provided in either the lid 23 or the wall of the drum 22 for purposes of loading and emptying the drum 22.

The method and the operation of the apparatus 10 of the present invention may be simply explained with reference to the FIGS. A desired quantity of pitted olives 30 is introduced into each drum 22, along with a desired quantity of a selected edible filling material 40. Beneficial results have been achieved using drums 22 having a volume of approximately 5 U.S. gallons each, filled about 50% full of pitted olives 30. However, effective results may also be achieved using drums 22 of other volumes, or by loading the drums 22 more or less than 50% full of pitted olives 30. The size of the drums 22 and the relative amount of pitted olives 30 loaded into the drums 22 are not critical to the method of the invention.

Once loaded with desired quantities of pitted olives 30 and filling material 40, each drum 22 is mounted onto one of the drum holders 14 (if not already so mounted). In the preferred embodiment, as best seen in FIG. 2, the rotational axis A of the drum holders 14 is tilted upward from horizontal; as previously mentioned, however, the rotational axis A in other embodiments could be substantially horizontal or tilted downward from the horizontal. The motor 16 is then actuated, causing the drive belt 20 to rotate the motor pulley 17 and the drum pulleys 18, thus causing each drum 22 to rotate about its rotational axis A, as generally indicated by the curved arrows in FIG. 1. This rotation causes the pitted olives 30 and the filling material 40 to be interminglingly agitated in a tumbling fashion. As each drum 22 rotates, a portion of the mixture of pitted olives 30 and filling material 40 inside the drum 22 is raised a distance along the inner surface of the drum 22 whereupon gravity eventually causes such portion of the mixture to drop onto the remainder of the mixture. It has been discovered that after the mixture has been agitated for a sufficient period of time, the cavities originally present in the pitted olives 30 will have become substantially packed with portions of the filling material 40.

The mechanism through which this beneficial result is achieved is not known with certainty. However, it is believed that the tumbling motion of the olive/filling mixture causes pieces or portions of the filling material 40 to impact the pitted olives 30 in random fashion but with a certain degree of kinetic energy. In many of these impacts, the filling material 40 will be impelled against the outer surfaces of the pitted olives 30, and will simply bounce off. In accordance with probability theory, however, in a certain proportion of these impacts, the filling material 40 will be impelled toward the openings of the cavities in the pitted olives 30, urging the filling material 40 into the cavities. It may also be that the filling material 40 is forced into the cavities at least partly due to direct pressure between the filling material 40 and the olives 30 during agitation of the mixture.

The apparatus 10 and method of the invention have been found to work well with edible fillings such as cheese or cheese mixtures of various types. However, beneficial results have also been achieved using filling materials such as pieces of vegetables including sun-dried tomatoes, pimientos, garlic, and pickled artichokes. As well, it has been found that the apparatus 10 and method may be used to stuff olives with nut meats such as almonds or almond pieces, provided that the nut meats or pieces are of a size compatible with the cavities in the pitted olives. It is believed that beneficial results should be generally obtainable with other edible filling materials not specifically referred to herein, provided that they comprise pieces small enough to be stuffed into the cavities of the olives, or if they are of relatively soft and shapeable consistency like cheese mixtures or meat pastes. The filling material 40 may comprise more than one of the exemplary filling materials mentioned above. Spices may also be added to the filling material 40 to enhance the flavour of the finished product.

The amount of time required to stuff pitted olives using the apparatus 10 and method of the invention will vary with a number of factors, including the size of the olive drums 22, the rotational speed of the drums 22, the characteristics of the particularly types of pitted olives 30 and filling material 40 being used, and the selected proportions of olives 30 and filling material 40. As only one example, satisfactory results have been obtained using 5-gallon drums 22 filled about 50% full of pitted olives 30, plus a quantity of filling material 40 made up primarily of feta cheese, and rotated at approximately 60 revolutions per minute for approximately 30 minutes, using for the motor 16 an electric gear motor of well-known type rated at approximately 1/10 horsepower. However, effective and beneficial results may be achieved using different combinations of drum size, types and quantities of olives and filling materials, motor types and power ratings, rotational speeds, and mixing times, as may be readily determined through reasonable experimentation.

In the preferred embodiment, the apparatus 10 of the invention includes speed regulation means schematically indicated by reference numeral 15 in FIG. 2), whereby the rotational speed of the drums 14 may be set as desired. The speed regulation means may comprise a speed governor or rheostatic control of known type. Alternatively, the speed regulation means may comprise a gearbox of known type.

Also in the preferred embodiment of the apparatus 10, the drum 22 is provided with ribs, vanes, or other types of protuberances generally indicated by reference numeral 25 in FIG. 2) on the interior surface of the drum 22. These ribs, vanes, or protuberances 25 further enhance the intermingling and mixing of the olives 30 and filling material 40, by helping to lift the olive/filling mixture as the drum 22 rotates, and tending to increase the height reached by the mixture before it falls, thus increasing the kinetic energy of the pieces or particles of filling material 40 such they will be more readily packed into the cavities in the pitted olives 30.

In another embodiment, the apparatus 10 includes reciprocation means (not shown), for moving the drum 22 in reciprocating fashion, in addition to its rotational motion. The reciprocating movement imparted to the drum 22 by the reciprocation means may be vertical, horizontal, or any other desired orientation. Whatever its orientation may be, such reciprocating movement of the drum 22 further enhances effectiveness of the intermingling and mixing of the olives 30 and the filling material 40, and the resultant filling of the olives 30.

Where any form of the verb "comprise" is used in the disclosure and claims herein, such use is intended in the non-limiting sense, whereby items or elements specifically referred to are included, but items or elements not specifically referred to are not excluded. As well, any reference to a claim element using the indefinite article "a" or "an" is intended in the non-limiting sense, so as to cover embodiments having more than one of such element unless the context clearly requires that there be only one such element.

It will be readily seen by those skilled in the art that various modifications of the present invention may be devised without departing from the essential concept of the invention, and all such modifications are intended to be included in the scope of the claims appended hereto.

What is claimed is:

1. Apparatus for stuffing pitted olives with an edible filling, said apparatus comprising:
    (a) a support frame;
    (b) a pair of drum holders rotatably mounted to the support frame, with the rotational axes of said drum holders being substantially parallel and of generally horizontal orientation;
    (c) drive means mounted to the frame and adapted to rotate the drum holders simultaneously about their rotational axes; and
    (d) a pair of drums, each drum being associated with one of the drum holders and:
        d.1 having an inner end, an outer end, and a longitudinal axis;
        d.2 being mountable at its inner end to its associated drum holder, with its longitudinal axis substantially coinciding with the drum holder's rotational axis;
        d.3 having an opening at its outer end; and
        d.4 having a lid for sealingly closing said opening;
    wherein the drive means includes an electric motor having an output shaft, and wherein the drive means further comprises:
    (e) a motor pulley fixedly mounted on the output shaft of the motor;
    (f) two drive pulleys, each of said drive pulleys being coaxially and fixedly mounted on an associated one of the drum holders; and
    (c) a drive belt deployed around the motor pulley and the drive pulleys, such that rotation of the output shaft will cause simultaneous rotation of the drum holders about their rotational axes.

2. The apparatus of claim 1 wherein each drum is of a shape selected from the group consisting of cylindrical, frustoconical, prismatically polygonal, and taperingly polygonal.

3. The apparatus of claim 1 wherein at least one of the drum holders comprises a sleeve into which the associated drum may be matingly inserted.

4. The apparatus of claim 1 wherein the electric motor is a gear motor.

5. The apparatus of claim 1 further comprising speed regulation means associated with the drive means, for selectively regulating and controlling the rotational speed of the drum holders.

6. The apparatus of claim 1, further comprising axis-tilting means associated with the mounting of the drive means to the frame, for adjusting the orientation of the rotational axes of the drum holders within the range between approximately five degrees above horizontal and approximately five degrees below horizontal.

7. The apparatus of claim 1 wherein at least one of the drums includes a plurality of inwardly projecting protuberances.

8. Apparatus for stuffing pitted olives with an edible filling, said apparatus comprising:

(a) a support frame;

(b) a pair of drum holders rotatably mounted to the support frame, with the rotational axes of said drum holders being substantially parallel and of generally horizontal orientation;

drive means mounted to the frame and adapted to rotate the drum holders simultaneously about their rotational axes; and (d) a pair of drums, each drum being associated with one of the drum holders and:

d.1 having an inner end, an outer end, and a longitudinal axis;

d.2 being mountable at its inner end to its associated drum holder, with its longitudinal axis substantially coinciding with the drum holder's rotational axis;

d.3 having an opening at its outer end; and d.4 having a lid for sealingly closing said opening;

wherein the drive means includes an electric motor having an output shall, and wherein the drive means further comprises:

(e) a motor sprocket fixedly mounted on the output shall of the motor;

(f) two drive sprockets, each of said drive sprockets being coaxially and fixedly mounted on an associated one of the drum holders; and (g) a drive chain deployed around the motor sprocket and the drive sprockets, such that rotation of the output shall will cause simultaneous rotation of the drum holders about their rotational axes.

9. The apparatus of claim 8 wherein each drum is of a shape selected from the group consisting of cylindrical, frustoconical, prismatically polygonal, and taperingly polygonal.

10. The apparatus of claim 8 wherein at least one of the drum holders comprises a sleeve into which the associated drum may be matingly inserted.

11. The apparatus of claim 8 wherein the electric motor is a gear motor.

12. The apparatus of claim 8 further comprising speed regulation means associated with the drive means, for selectively regulating and controlling the rotational speed of the drum holders.

13. The apparatus of claim 12 wherein the speed regulation means comprises a rheostatic control.

14. The apparatus of claim 12 wherein speed regulation means comprises a gearbox.

15. The apparatus of claim 8, further comprising axis-tilting means associated with the mounting of the drive means to the frame, for adjusting the orientation of the rotational axes of the drum holders within the range between approximately five degrees above horizontal and approximately five degrees below horizontal.

16. The apparatus of claim 8 wherein at least one of the drums includes a plurality of inwardly projecting protuberances.

17. Apparatus for stuffing pitted olives with an edible filling, said apparatus comprising:

(a) a support flame;

(b) a pair of drum holders rotatably mounted to the support frame, with the rotational axes of said drum holders being substantially parallel and of generally horizontal orientation;

(c) drive means mounted to the frame and adapted to rotate the drum holders simultaneously about their rotational axes;

(d) a pair of drums, each drum being associated with one of the drum holders and:

d.1 having an inner end, an outer end, and a longitudinal axis;

d.2 being mountable at its inner end to its associated drum holder, with its longitudinal axis substantially coinciding with the drum holder's rotational axis;

d.3 having an opening at its outer end; and d.4 having a lid for sealingly closing said opening; and (e) axis-tilting means associated with the mounting of the drive means to the frame, for adjusting the orientation of the rotational axes of the drum holders within the range between approximately five degrees above horizontal and approximately five degrees below horizontal;

wherein the axis-tilting means comprises:

(f) a hinged connection between the drive means and the frame, with the axis of the hinged connection being transverse to the rotational axes of the drum holders; and (g) clamping means, for releasably clamping the drive means in a desired angular orientation relative to the frame;

whereby when the clamping means is released, the drive means may be tilted about the hinge axis to adjust the angular orientation of the drum holders' rotational axes, and the clamping means may be engaged to releasably clamp the drive means in a selected orientation.

* * * * *